US006967999B2

(12) United States Patent
Subramanian et al.

(10) Patent No.: US 6,967,999 B2
(45) Date of Patent: Nov. 22, 2005

(54) METHOD AND APPARATUS TO SUPPORT MULTI STANDARD, MULTI SERVICE BASE-STATIONS FOR WIRELESS VOICE AND DATA NETWORKS

(75) Inventors: Ravi Subramanian, Mountain View, CA (US); Keith Rieken, Cupertino, CA (US); Uma Jha, Placentia, CA (US); Joel D. Medlock, Los Gatos, CA (US); Christopher C. Woodthorpe, Los Gatos, CA (US)

(73) Assignee: Infineon Technologies AG, Munich (DE)

( * ) Notice: Subject to any disclaimer, the term of this patent is extended or adjusted under 35 U.S.C. 154(b) by 694 days.

(21) Appl. No.: 09/752,050

(22) Filed: Dec. 29, 2000

(65) Prior Publication Data

US 2002/0024993 A1     Feb. 28, 2002

Related U.S. Application Data

(60) Provisional application No. 60/173,630, filed on Dec. 30, 1999, provisional application No. 60/178,815, filed on Jan. 28, 2000.

(51) Int. Cl.$^7$ .............................................. H04B 17/00
(52) U.S. Cl. ....................................... 375/224; 712/34
(58) Field of Search ............................... 375/222, 316, 375/224–226, 340, 343, 130; 712/1, 32–34

(56) References Cited

U.S. PATENT DOCUMENTS

| 4,606,044 A | | 8/1986 | Kudo | |
| 4,800,574 A | * | 1/1989 | Tanaka et al. | 375/243 |
| 5,546,383 A | * | 8/1996 | Cooley et al. | 370/330 |
| 5,649,176 A | * | 7/1997 | Selvidge et al. | 713/400 |
| 6,097,336 A | * | 8/2000 | Stilp | 342/357.02 |
| 6,173,243 B1 | * | 1/2001 | Lowe et al. | 703/14 |
| 6,275,891 B1 | * | 8/2001 | Dao et al. | 710/317 |
| 6,400,728 B1 | * | 6/2002 | Ott | 370/465 |

* cited by examiner

*Primary Examiner*—Kevin Burd
(74) *Attorney, Agent, or Firm*—Darby & Darby

(57) ABSTRACT

An apparatus for digitally processing signals within wireless communications base-stations which includes a channel pooling signal processor and a digital signal processor. The channel pooling signal processor includes a plurality of computation units typically realized in a heterogeneous multiprocessing architecture, a test interface for testing the function of the plurality of the computation units, a general-purpose microprocessor for managing the dataflow into and out of the channel pooling signal processor as well as effecting the control and configuration of the computation units, and an interconnect mechanism for connecting the plurality of computation units to the input, output, test interface, and the general-purpose microprocessor.

35 Claims, 18 Drawing Sheets

Signal Processing Functions 200

| 202 | 204A<br>Rx Filer | 204B<br>Complex Despreader | 204C<br>Short Code | 204D<br>Scrambling | 204E<br>Walsh |
|---|---|---|---|---|---|
| CGU overhead | 242 | 12 | 3 | 3 | 4 |
| DLL error signal (non coherent) | | 12 | | 0 | |
| DLL error signal (coherent) | | 6 | 3 | 3 | 4 |
| Pilot | | | | | 4 |
| R-FCH | | | | | 4 |
| R-DCCH | | | | | 4 |
| R-SCH 1 | | | | | 4 |
| R-SCH 2 | | | | | |

Data Paths

FIG. 7

| Parameter Estimation Functions | TDMA | | | | CDMA | | | | |
|---|---|---|---|---|---|---|---|---|---|
| | IS136 | GSM | GPRS | EDGE | IS-95B | IS-2000 | WCDMA-FDD | GPS | GLOBALSTAR |
| IMS Channel Estimator | | X | X | X | | | | | |
| Windowed Average Energy Estimator | X | X | X | X | X | X | X | X | X |
| ML Symbol Timing Estimator | X | X | X | X | X | X | X | X | X |
| ML Carrier Phase Estimator | X | X | X | | X | X | X | | X |
| PN Correlator | | | | | | | X | | |
| Matched Filter | | | | | | X | X | X | |
| Interference Energy Estimator | | | | | | X | | | |

FIG. 8

| CDMA Computation Unit Library ||
|---|---|
| *Front End Processing*<br>    Sample Interpolation | *Parameter Estimation*<br>    Energy Estimator<br>    Timing Parameter Estimator<br>    Channel Estimator |
| *Chip Rate Processing*<br>    Sample Epoch Selection<br>    Matched Filter<br>    Generic Despreader<br>    Generic Dechannelizer<br>    Code Generation Unit<br>    Integrate and Dump<br>    Generic Searcher Control | *Channel Element Processing*<br>    Alignment/Deskewing<br>    Combiner<br>    Soft Decision Computer<br>    Interpath Interference Equalizer<br>    Receive Antenna Diversity Combiner |
| *Symbol Sequence Processing*<br>    Transport Format Decoder<br>    Dynamic Spreading Factor Computer<br>    Fast Hadamard Transform<br>    Rotator/Squarer | *Interleaving*<br>    Deinterleaver Controller |
| | *Channel Decoding*<br>    Turbo Decoder<br>    Convolutional Decoder |

FIG. 15

| TDMA Computer Unit Library ||
|---|---|
| *TDMA Modem Transmitter*<br>Pulse-shaping<br>Multiplexing | *TDMA Modem Receiver*<br>Front-end Filtering<br>Adaptive Demodulation |
| Link Adaptation (AMR)<br>Antenna Transmit Diveristy | Synchronization<br>Adaptive Parameter Estimation<br>Diversity Combining<br>Link Adaptation |
| *Channel Decoder*<br>Reed Solomon Codes Decoding<br>Fire Codes Decoding<br>Decryption<br>Deinterleaving | *Channel Encoder*<br>Encoding<br>Encryption<br>Interleaving |

FIG. 16

METHOD AND APPARATUS TO SUPPORT MULTI STANDARD, MULTI SERVICE BASE-STATIONS FOR WIRELESS VOICE AND DATA NETWORKS

This application claims priority to the provisional patent applications with the following Ser. Nos.: 60/173,630 and 60/178,815, filed on Dec. 30, 1999 and Jan. 28, 2000, respectively.

CROSS REFERENCES

This application is related to the following applications which are incorporated herein by reference: a U.S. patent application entitled "A CONFIGURABLE ALL-DIGITAL COHERENT DEMODULATOR SYSTEM FOR SPREAD SPECTRUM APPLICATIONS", bearing application Ser. No. 09/751,783; a U.S. patent application entitled "A CONFIGURABLE MULTI-MODE DESPREADER FOR SPREAD SPECTRUM APPLICATIONS" bearing application Ser. No. 09/751,785; a U.S. patent application entitled "APPARATUS AND METHOD FOR CALCULATING AND IMPLEMENTING A FIBONACCI MASK FOR A CODE GENERATOR" bearing application Ser. No. 09/751,776; a U.S. patent application entitled "A FAST INITIAL ACQUISITION & SEARCH DEVICE FOR A SPREAD SPECTRUM COMMUNICATION SYSTEM" bearing application Ser. No. 09/751,777; and a U.S. Patent Application entitled "A CONFIGURABLE CODE GENERATOR SYSTEM FOR SPREAD SPECTRUM APPLICATIONS" bearing application Ser. No. 09/751,782. All of the above applications are filed simultaneously herewith on Dec. 29, 2000.

BRIEF DESCRIPTION OF THE INVENTION

This invention relates generally to reconfigurable signal processors. Such processors are useful in wireless communication systems and, more particularly, in a method and apparatus for transmitting voice and data between multi-standard, multi-service base-stations. The invention will be described in such context.

BACKGROUND OF THE INVENTION

In order to transmit and receive circuit and packet-switched voice and data traffic in a multi-user wireless communications environment, with services such as voice, video, image, data, fax, IP-based traffic transmissions, etc., it is necessary to employ a base-station transceiver system (hereafter referred to as "BTS"). A BTS provides a link for sending and receiving wireless communications within a localized region. Recently, there has been an increase in demand for different types of wireless communication services.

This has led to the need for data services (the term "data services" includes both voice and data services) requiring greater bandwidths and an increased number of channels. In addition, there is a growing need for BTSs to support multiple standards and protocols (i.e., service classes). Traditional signal processing architectures, such as that shown in FIG. 1, do not accommodate enough channels of each service class to satisfy the needs of these data services.

The prior art signal processing architecture shown in FIG. 1 shows a processor 108 that performs signal processing to condition, mix, and filter a signal residing on a radio frequency (RF) carrier. The RF signal is initially received at an antenna 90, is processed by radio frequency circuitry 92 and intermediate frequency (IF) circuitry 94, prior to being digitized with an analog-to-digital (A/D) converter 96. The processor 108 delivers a signal to a system 109, which includes individual circuits 110A–N for each time slot or code slot. A per-time-slot system is used in TDMA based multiple access communication systems. A per-code-slot system is used in CDMA based multiple access communication systems.

Each circuit 110 is typically realized as a single-bus shared memory co-processing architecture which includes at least one application specific fixed function integrated circuit 114, one digital signal processor 116, and one memory 118 for processing data in that channel. A problem associated with the traditional signal processing architecture, such as that shown in FIG. 1, is an inadequate level of integration when the number of channels and the data rate increase. This is due to the single bus, shared-memory architecture. Typically, as the number of channels increases, an increase in the system operating frequency is required. This is typically manifested by using a traditional digital signal processor at a very high clock speed to support this higher channel density. An increasingly greater portion of this increased horsepower is used up in being able to read and write data into memory fast enough. This results in practical implementations of these single-bus shared-memory architectures requiring a greater than linear increase in clock speed to obtain a linear increase in the channel density. In the prior art, the level of integration, such as trunking efficiency, is typically increased by increasing the speed and/or number of digital signal processors on a circuit 110. The problem with this approach is that achieving increased channel demodulation and decoding processing power is often at the expense of significantly increased power dissipation, silicon area and product cost.

The problems of inadequate efficiency, demand for greater bandwidths, and more channels per data service have necessitated the development of an efficient, cost effective mechanism for the processing of wireless data.

SUMMARY OF THE INVENTION

In one embodiment of the invention, signal processing is performed in a signal processor that includes a plurality of computation units, a test interface, a general purpose microprocessor, and an interconnect mechanism. The signal processor is referred to as a "channel pooling signal processor." Additionally, in an exemplary embodiment, a separate digital signal processor is also used with the channel pooling signal processor.

The computation units are flexibly configured and connected in that they may be used to achieve any one of several different transceiver functions. For example, the computation units can be configured to perform downconversion, dechannelization, demodulation, decoding, equalization, despreading, encoding, modulation, spreading, diversity processing. These computation units are typically able to support a specific type of signal processing associated with a specific class of waveforms (time-division, code-division, of frequency-division), represented by a mathematical function or sequence of mathematical functions operating across a variety of data rates, as well as multiple modes of operation.

The test interface is used for testing all internal states of the channel pooling signal processor, including testing the functions of the computation units. The general purpose microprocessor manages control of how the data flowing into and out of the channel pooling signal processor. Typically, the general purpose microprocessor is a programmable microprocessor capable of setting up the interconnect to route data from the input of the channel pooling signal processor, to and from any computation unit, and to the output of the channel pooling signal processor. The interconnect mechanism is used for connecting the components of the channel pooling signal processor to one another. In other words, the interconnect mechanism joins the computation units, the test interface, and the input-output interface, such that all of these components are under the control of the general-purpose microprocessor.

In another embodiment of the invention, the signal processing is performed using more than one channel pooling signal processor. The additional channel pooling signal processor(s) allow the method and structure to process multiple data streams corresponding to multiple channels of voice or data information.

An advantage of the method and structure of an embodiment of the invention is the ability to provide a linear increase in channel density solely via a linear increase in the system operating frequency or clock speed.

Another advantage of the method and structure of an embodiment of the invention includes the ability to use more than one channel pooling signal processor. Using multiple channel pooling signal processors allows multiple data streams corresponding to multiple channels to be processed.

Another advantage of the disclosed technology is that the general purpose microprocessor can enable configuration across different operating modes, for example, including: service type, channel type, data protection type, modulation type, and reception type.

An additional advantage of the invention is that a set of computation units may be optimized for the execution of functions with high computational complexity.

Still another advantage of the invention is that a greater number of channels can be processed on the same BTS, thus circumventing limitations of the prior art.

BRIEF DESCRIPTION OF THE DRAWINGS

FIG. 7 illustrates profiling of computationally intensive functions in accordance with an embodiment of the invention.

FIG. 8 illustrates profiling commonality of functions across wireless communications standards in accordance with an embodiment of the invention.

FIG. 15 illustrates an exemplary library of CDMA computation units in accordance with an embodiment of the invention.

FIG. 16 illustrates an exemplary library of TDMA computation units in accordance with an embodiment of the invention.

DETAILED DESCRIPTION OF THE INVENTION

Figure 1:
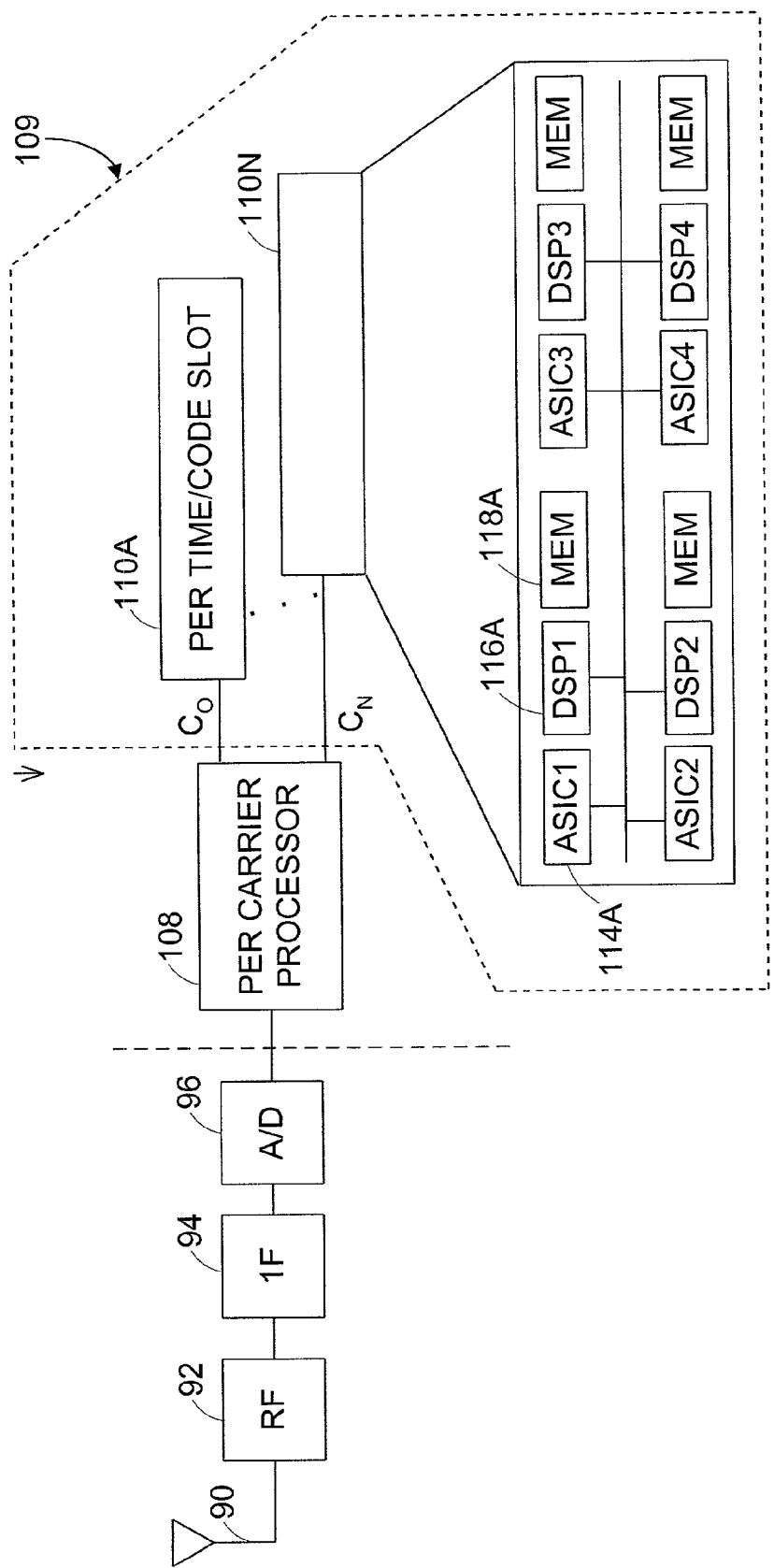
FIG. 1 illustrates a prior-art architecture of a traditional base-station transceiver system.
Figure 2:
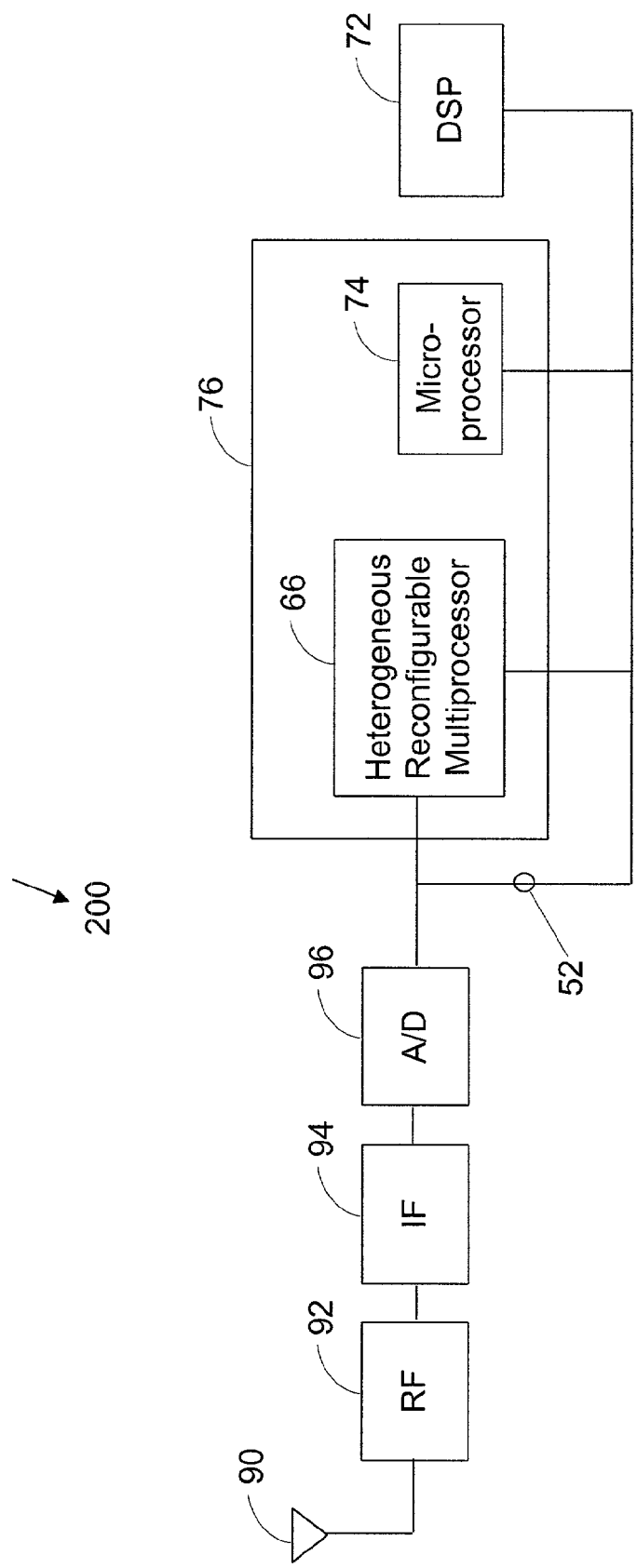
FIG. 2 illustrates an exemplary base-station transceiver system in accordance with an embodiment of the invention.

FIG. 2 illustrates an exemplary base station transceiver system (BTS) 200 in accordance with an embodiment of the invention. The BTS 200 receives signals via the antenna 90. The received signals are processed by the RF circuitry 92 and the IF circuitry 94 to provide one or more intermediate frequency signals. Next, the processed signal is digitized via the A/D converter 96, whose output is placed on a bus 52. Signals from the bus 52 are routed to a heterogeneous reconfigurable hardware multiprocessor 66, a general purpose microprocessor 74 and a DSP microprocessor 72. In an exemplary embodiment, the heterogeneous reconfigurable hardware multiprocessor 66 and the general purpose microprocessor 74 are referred to as a channel pooling signal processor 76. In another exemplary embodiment, the DSP microprocessor 72 is a commercially available DSP microprocessor, such as the TMS320C6X family of DSPs made by Texas Instruments, the Starcore SC140 DSP made by Lucent, or the Tigersharc DSP made by Analog Devices.

In an exemplary embodiment, the heterogeneous reconfigurable multiprocessor 66 includes a pool of parallel hardware signal processors referred to as computation units or kernels. The computation units perform the more computationally intensive signal processing operations required by a set of telecommunications standards, applications and services of interest, and are selected and configured in a modular, non-redundant manner. The individual computation units and their interconnections can be quickly reconfigured, so that the BTS 200 can quickly switch from one standard, application, and/or service of interest to another. The DSP 72 performs the less computationally intensive signal processing functions, while the microprocessor 74 performs control and other functions. Each hardware device is controlled by a corresponding software module. A detailed description of the relationship between the software module and the hardware devices (i.e., multiprocessor 66, DSP 72, and general purpose microprocessor 74) is explained in U.S.

Patent Application entitled "Reprogrammable Digital Wireless Communication Device and Method of Operating Same" bearing Ser. No. 09/565,687. This application is hereby incorporated by reference for all purposes.

Figure 3:
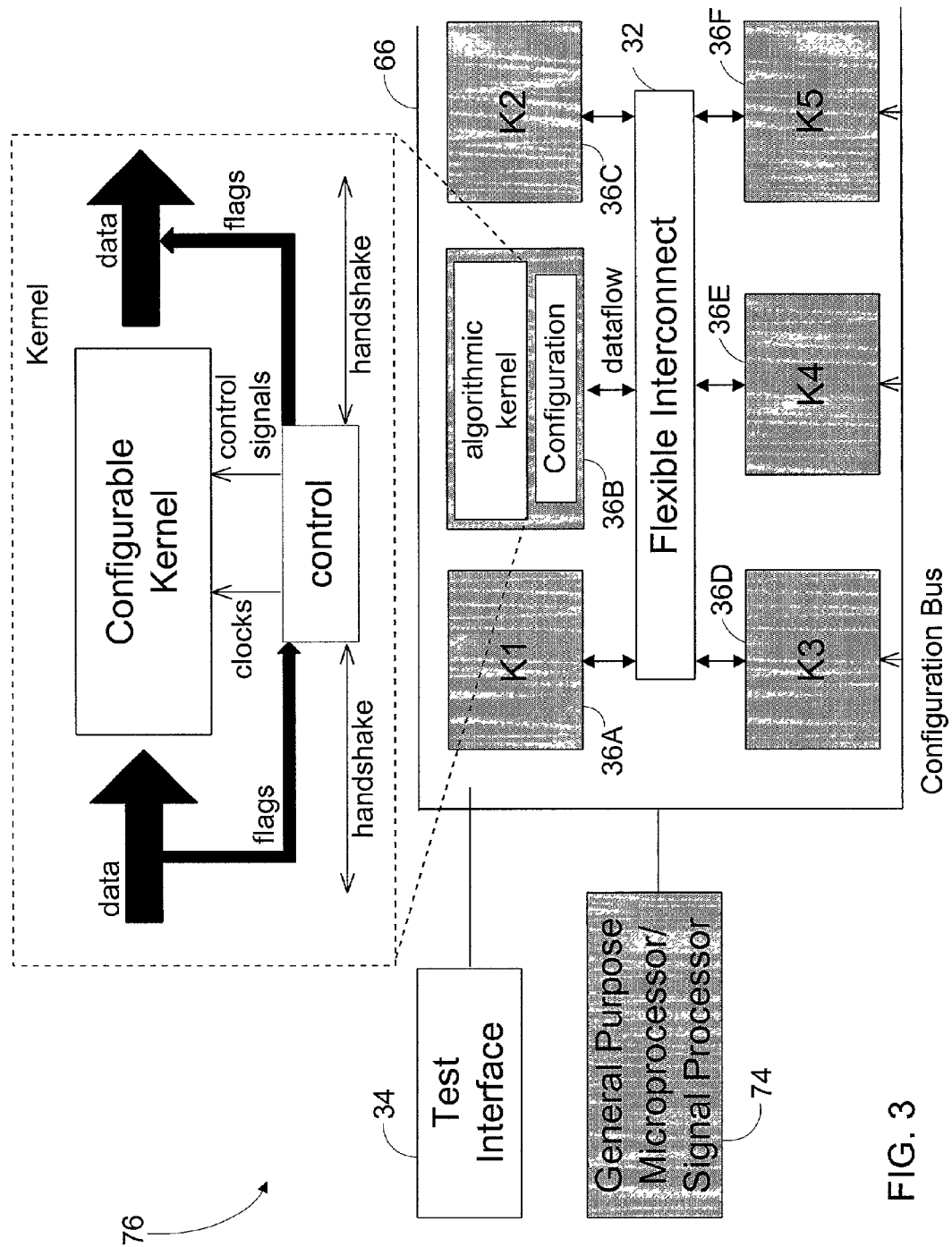
FIG. 3 illustrates an exemplary channel pooling signal processor in accordance with an embodiment of the invention.

FIG. 3 illustrates an exemplary architecture of the channel pooling signal processor 76 in accordance with an embodiment of the invention. The channel pooling signal processor 76 includes the heterogeneous reconfigurable hardware multiprocessor 66, the general purpose microprocessor 74, and a test interface 34. In an exemplary embodiment, the heterogeneous reconfigurable hardware multiprocessor 66 includes multiple computation units 36A–36F and an interconnect mechanism 32. In an exemplary embodiment, the general purpose microprocessor 74 is a programmable microprocessor capable of routing data from the input of the channel pooling signal processor 76 to and from any computation unit 36. In another exemplary embodiment, the general purpose microprocessor 74 manages the dataflow into and out of a system of multiple channel pooling signal processors 76. This dataflow is typically executed in a data-pump fashion, with local memory being the destination and source of the data into and out of the channel pooling signal processors 76.

The interconnect mechanism 32 provides a means for connecting the computation units 36, other components of the channel pooling signal processor 76, and other components in the BTS 200 to each other. For example, the interconnect mechanism 32 is capable of changing configurations for specific channels, while maintaining the status and operation modes of all other channels in an unchanged condition. In one embodiment, the interconnect mechanism 32 can be any interconnect mechanism known in the art such as a switch and switch controller, or a set of buses and a bus-controller. Preferably, the switch controller or bus-controller includes software to change the configurations for specific channels while maintaining the status and operating modes of all other channels in an unchanged state.

The test interface 34 allows the user to test the channel pooling signal processor 76 in all operating modes, including testing the computation units 36 in various modes of operation. The flexibility of the interconnect mechanism 32 and the general purpose microprocessor 74 allows individual computation units 36 to be tested for functionality and reliability while maintaining the status and operating modes of all other channels in an unchanged state. In an exemplary embodiment, the test interface 34 is implemented using JTAG or a proprietary testing interface.

The computation units 36A–36F perform the more computationally intensive operations required of BTS200. In an exemplary embodiment, computation units 36 are flexibly configurable and may be used to achieve any one of several different functions. These functions include, but are not limited to, channel decoding, equalization, chip-rate processing, synchronization, digital down-conversion and channelization, and parameter estimation of signal energy, interference energy, number of interferers, timing signals, coding signals, frequency signals, and error signals. Computation units 36 may be implemented to support a mathematical function operating across a variety of data rates, and/or modes of operation. In the usual case, these modes of operation correspond to specific predefined variations of existing dataflow or control flow algorithms, including, but not limited to, demodulation, despreading, detection, MLSE equalization, parameter estimation, energy estimation, synchronization estimation, channel estimation, interference estimation, channel decoding, convolutional decoding, and turbo decoding for narrowband and wideband TDMA, CDMA, and OFDM systems.

The type and number of computation units 36 required by the BTS 200 is determined according to system architecture requirements. The system designer bases system architecture requirements on factors including the number of channels required to support the BTS 200 and the I/O bandwidth required per BTS 200. The resulting BTS 200 architecture may have either a homogeneous or heterogeneous set of computation units 36. A detailed description of an exemplary method used to determine the type and number of computation units 36 is explained in U.S. Patent Application entitled "Method of Profiling Disparate Communications and Signal Processing Standards and Services" bearing Ser. No. 09/565,654. This application is hereby incorporated by reference for all purposes.

Figure 4:
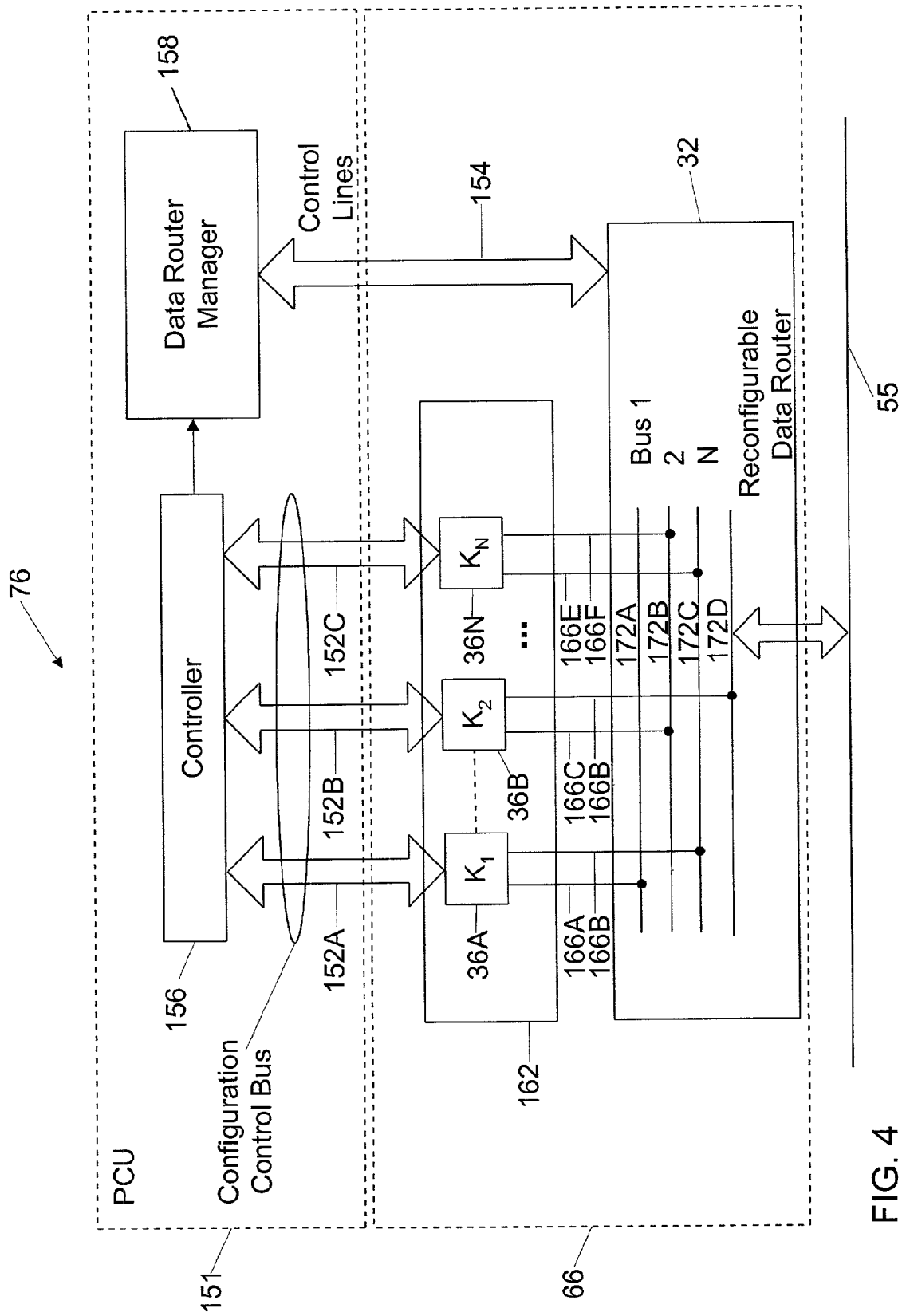
FIG. 4 illustrates a detailed embodiment of the architecture of FIG. 3.

FIG. 4 schematically illustrates a detailed exemplary embodiment of the channel pooling signal processor 76 in FIG. 3. The channel pooling signal processor 76 includes a program control unit (PCU) 151 and a heterogeneous reconfigurable multiprocessor 66. In one embodiment, the program control unit 151 is controlled by the general purpose microprocessor 74 according to a respective module of the executive code running on microprocessor 74. The executive code is a segment of the microprocessor executable programs stored in memory that orchestrates overall configuration and functionality. In an exemplary embodiment, the program control unit 151 includes a controller 156 and a data router manager 158. The controller 156 configures a set of quasi-fixed-function logic computation units 36A–N in the heterogeneous reconfigurable multiprocessor 66. In a typical application, the executive code executes on the general purpose microprocessor 74 or the DSP microprocessor 72, and the functionality of controller 156 is allocated to these microprocessors (72 and 74) and associated peripherals such as memory and various bus interfaces. FIG. 4 further illustrates that individual computation units 36 may be interconnected either directly, as per representative path 164, or via reconfigurable data router 32. Reconfigurable data router 32 further receives input data from and delivers output data to bus 55. Reconfigurable data router 32 is controlled by the data router manager 158 via control bus 154, and in turn via controller 156 and the executive code.

If there are multiple non-identical computation units, the heterogeneous reconfigurable multiprocessor 66 operates during execution as a heterogeneous multiprocessing machine. Based on the selection of computation units 36, an augmented instruction set is defined for the heterogeneous reconfigurable multiprocessor 66. This augmented instruction set can be created, for example, by using a wide-word instruction by appending bits to an existing instruction word, with the new bit fields exclusively devoted to the decoding of instructions for the control and data flow for the heterogeneous reconfigurable multiprocessor. The instruction word, when decoded, feeds control units 156 and 158 of FIG. 4. Controller 156 performs the role of taking the decoded instruction fields and configuring the computation units 36 and reconfigurable data router 32, via data router manager 158. The control of the reconfigurable data router 32 is effected via a control word, which, in a preferred implementation, is a bit field extracted from the instruction word.

Figure 5:
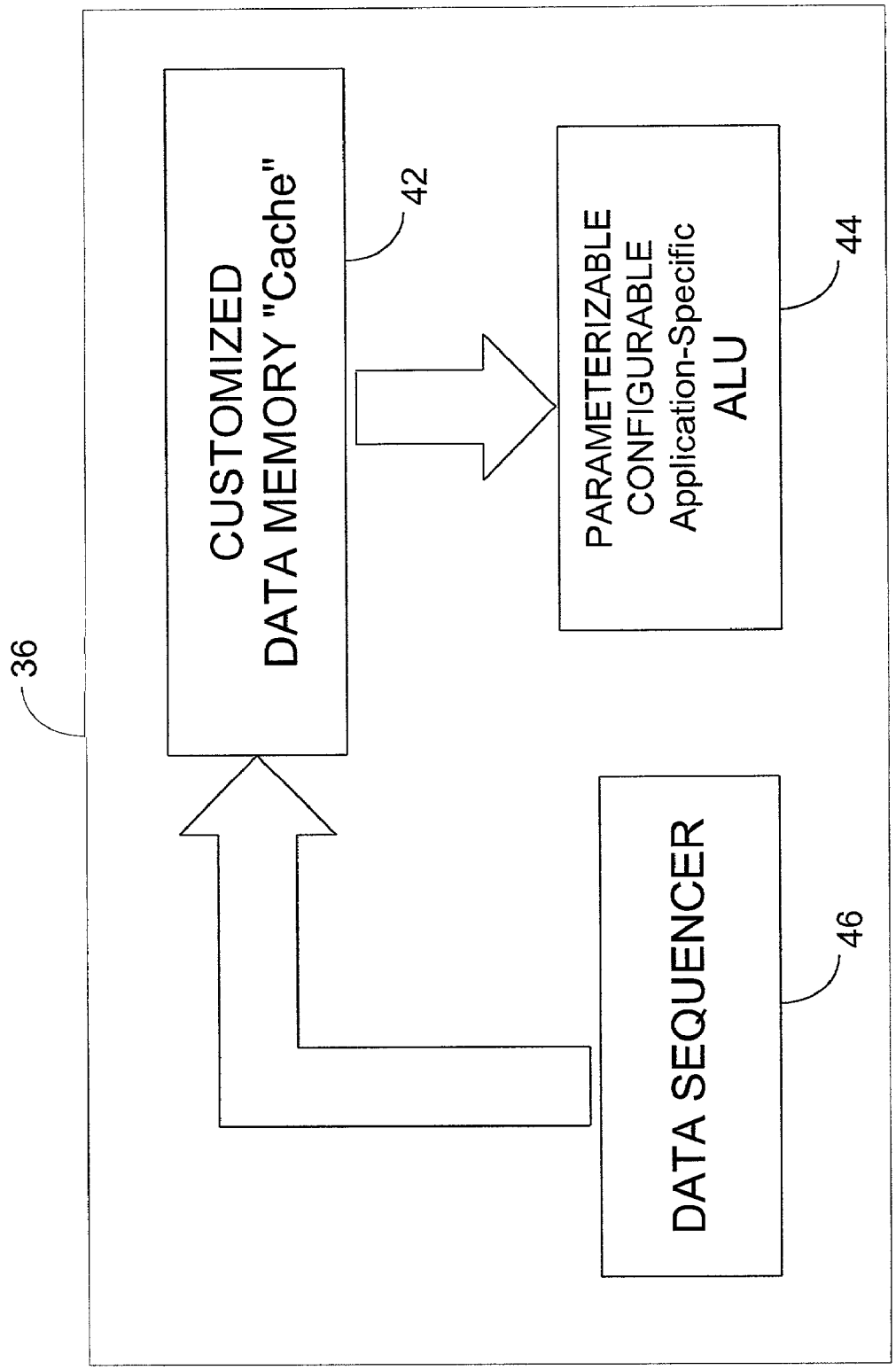
FIG. 5 illustrates a computation unit (kernel) constructed in accordance with an embodiment of the invention.

FIG. 5 illustrates an exemplary computation unit 36 in accordance with an embodiment of the invention. The computation unit 36 is designed to execute the computationally intensive portions of the digital signal processing algorithms required to extract data from each of the channels processed in the BTS 200. In an exemplary embodiment, the computation unit 36 includes a customized data memory 42, a configurable ALU 44, and a data sequencer 46. The memory 42, which serves as a high-speed cache, may be used to store operating instructions, results of an algorithmic computation, or the like, of the computation unit 36. The data sequencer 46 controls the execution of the program defining the operating instructions that runs in the computation unit 36. The ALU 44 performs required mathematical operations on signal samples or data. Computation units 36 are compute engines, and their nature as well as that of their interconnection is governed by any bit-slice, nibble-slice, and word-slice routing control mechanism, including, but not limited to, a programmable bus.

Figure 6:
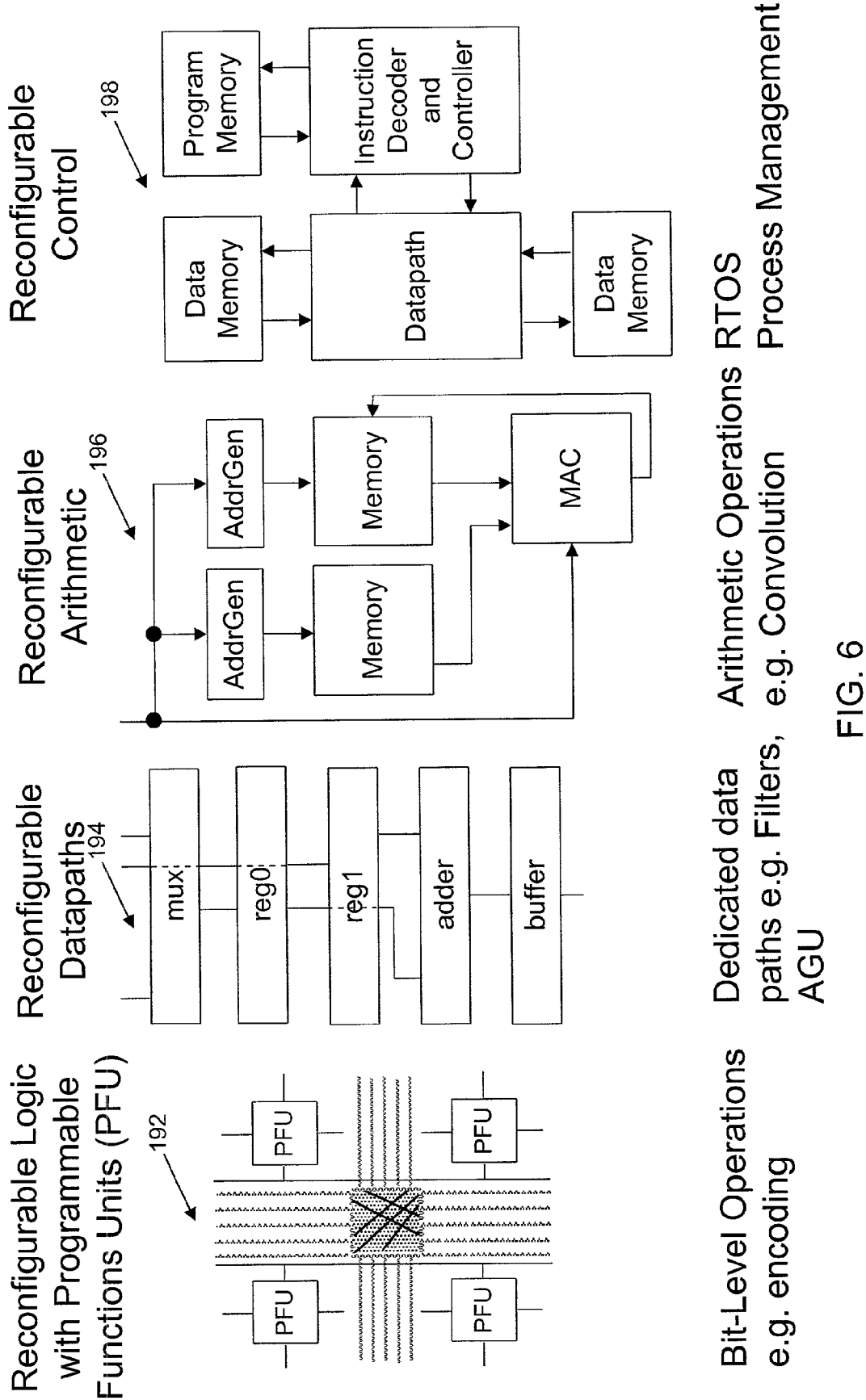
FIG. 6 illustrates configurable architectures that may be implemented in accordance with an embodiment of the invention.

For further illustration, FIG. 6 shows several representative or available configurable architectures that may be implemented by one or more computation units 36. Computation units 36 can be reconfigured via control lines 152 to determine what operations are possible. Similarly, the reconfigurable data router 32 of FIG. 4 can be controlled to effectively re-order the sequence of signal processing operations performed by computation units 36.

The heterogeneous reconfigurable multiprocessor 66 is designed according to a method referred to as profiling. Profiling includes the first step of surveying all signal processing and control functions required to accommodate the standards, applications, and/or services of interest. The most computationally intensive of these functions are then targeted to the heterogeneous reconfigurable multiprocessor 66, while the remaining functions are targeted to the DSP microprocessor 72. Typically, computational intensity is enumerated in units of millions of operations per second (MOPS). For example, FIG. 7 depicts functions 204A–E and corresponding MOPS required by each function 204 that could be performed by heterogeneous reconfigurable hardware multiprocessor 66. These metrics are calculated for the various pertinent signal processing datapaths listed in the column 202.

Additionally, computationally intensive functions are further categorized according to type of operation, e.g., arithmetic/logical, control, and memory access. For each category, characteristic power per MOPS is determined for hardware or software implementation from vendor data, analysis, or other means. Power, e.g., milliwatts, required per function is thereby characterized for implementation in both reconfigurable hardware or in software (i.e., running on a processor whose power-per-MOPS has been characterized). In addition, the corresponding code size (and therefore memory requirement) for software implementation is determined. From the above, and from budgeted power and memory resources, allocation of processing operations to hardware and software processors can be determined.

The entries in spreadsheet 200 correspond to a measurement of the number of static operations of a given type required to realize a receiver for a particular standard, i.e., to a specific time within a dynamic operational scenario. The analysis of FIG. 7 must be repeated as necessary to reflect important temporal variations in the type, number, and sequence of operations during representative/ realistic scenarios for all standards, applications, and/or services of interest. The results of these analyses must be interpreted to reveal additional critical metrics of computational intensity, including, but not limited to, average and peak MOPS for each relevant operation. This enables the requisite specifications for the hardware and software processing resources to be further evaluated.

The second step of profiling involves analysis of commonality of signal processing functions across the standards, applications, and/or services of interest. An exemplary analysis is represented in FIG. 8. Included in abridged spreadsheet 220 are representative standards/ applications, and respective relevant signal processing functions within the general category of parameter estimation. FIG. 8 shows, for example, that a Windowed Average Energy Estimator is required by seven of the listed standards. The designer would research the respective requirements of each of these seven standards to determine the required superset and seven subsets of functionality.

Figure 9:
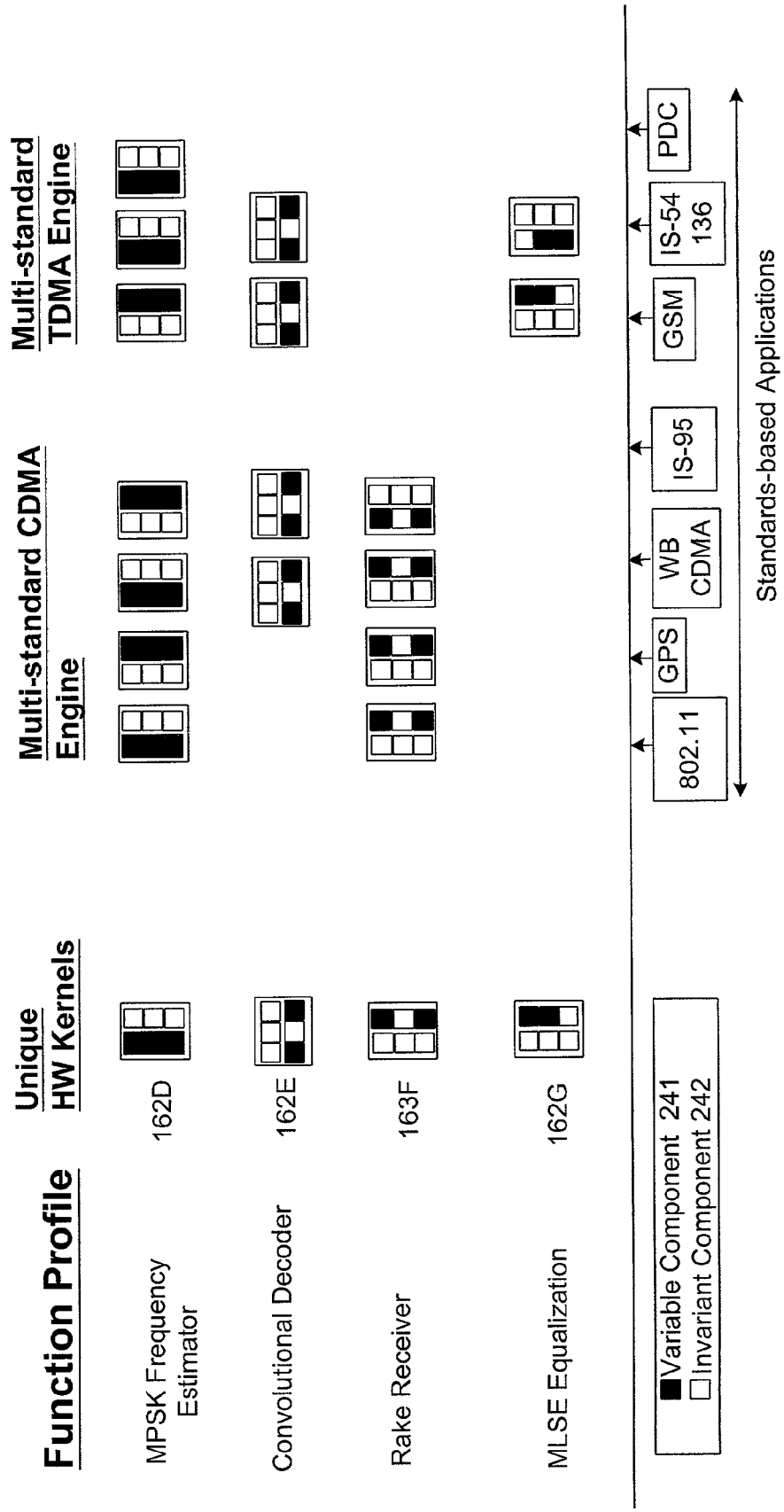
FIG. 9 illustrates the characterization of data processing computation units with variable and invariant components in accordance with an embodiment of the invention.

The third profiling step, defining the data processing computation units 36 necessary to serve the standards, applications, and/or services of interest, is shown conceptually in FIG. 9 for a different set of standards. In general, each unique type of computation unit 36 includes a combination of variable and invariant components. Invariant components 241 are determined by the above steps to be common across the standards, applications, and/or services of interest, while variable components 242 are determined by the above steps to be necessary to adapt to the various standards, applications, and/or services of interest. Each computation unit 36 is designed to include sufficient control and interface functionality to permit reconfiguration according to the end operational scenario.

Figure 10:
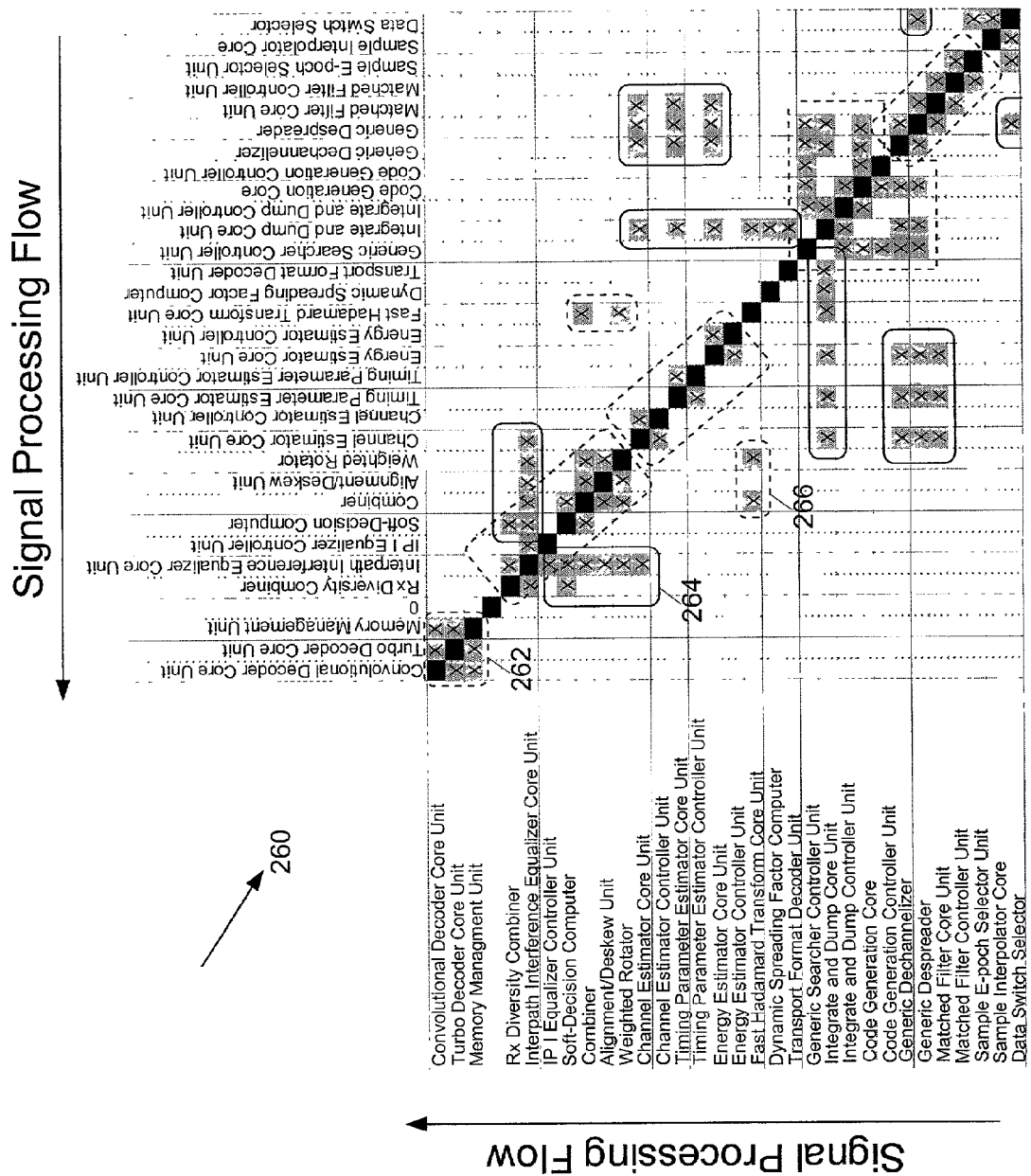
FIG. 10 illustrates profiling data flow among data processing computation units in accordance with an embodiment of the invention.

The interconnection of computation units 36 must also be determined from profiling as shown in the exemplary abridged matrix 260 of FIG. 10. The rows and columns of matrix 260 show a representative set of hardware signal processing computation units that have been defined according to the above profiling steps, along with all connections necessary to serve a representative set of CDMA-based wireless communication standards. Rather than using general-purpose interconnect, such as shared buses, which allows for the realization of all connections between all computation units at a great loss in energy and computational efficiency, the interconnection flexibility required can be derived by analyzing the dataflow from profiling, thereby ensuring that un-necessary flexibility is in fact avoided. Along the axes of matrix 260, signals generally flow from bottom to top, or from right to left, with exceptions as indicated. Each cell containing an "X" represents a required interface between the respective computation units 36. It can be seen that in the vicinity of the diagonal, interconnections are tightly clustered, as for example cluster 262. Other types of interconnections include parallel connections, e.g., 264, and isolated connections, e.g., 266. Where common across all standards, applications, and/or services of interest, these interconnections are made directly, as represented by connection 164 of FIG. 4. Conversely, connections that must change as a function of standard etc. must be effected by the reconfigurable data router 32 of FIG. 4.

To summarize, reconfiguration of the heterogeneous reconfigurable multiprocessor 66 is affected by i) selection of hardware processing computation unit types, ii) control of the variable computation unit functionality, and iii) control of the reconfigurable data router 32.

Figure 11:
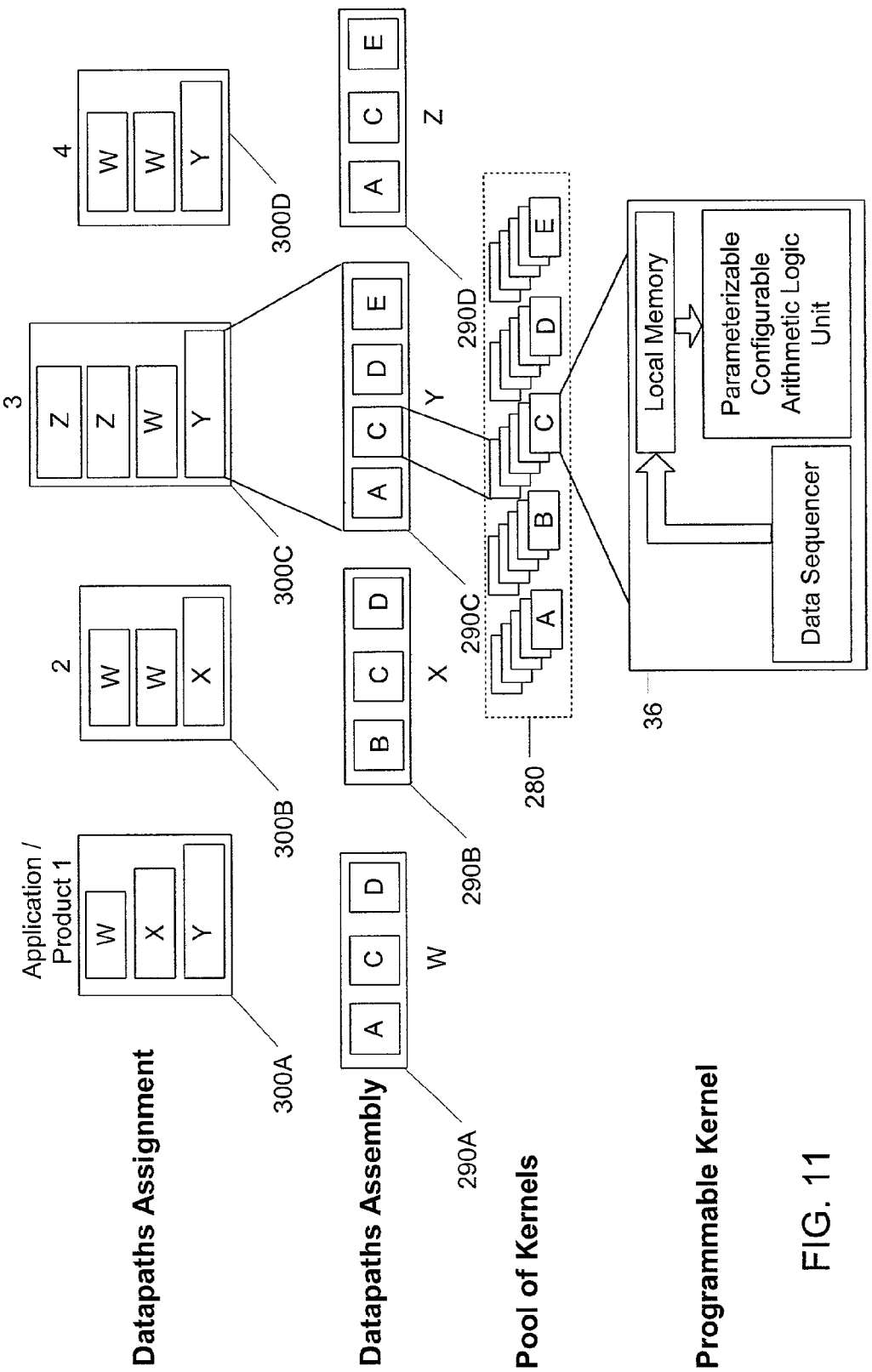
FIG. 11 illustrates an exemplary process to configure one or more products in accordance with an embodiment of the invention.

Once the computation unit types and interconnections have been determined, the multiplicity of each computation unit type needs to be determined, as illustrated in FIG. 11. A computation unit pool 280 includes a sufficient number of each type of computation unit 36 to permit the assembly of multiple datapaths 290. In turn, a sufficient multiplicity of datapaths 290A–D is assembled to accommodate the signal processing requirements of a particular standard, service or application. This is illustrated for a number of representative applications and/or products 300A–D. The portfolio 300A–D can represent either a single product having multi-mode/standard /application capability, or multiple, separate products based on common underlying hardware and software resources.

Thus, a manufacturer can enjoy mass customization based on a common product "platform." Initial or subsequent configuration can be performed in the factory, at point-of-sale, by the network operator at time of delivery, or by the network operator or service provider while in the field. Post-delivery customization can be based upon any of a number of techniques, including but not limited to smart card, wired interface, and over-the-air/over-the-network download and billing.

Figure 12:
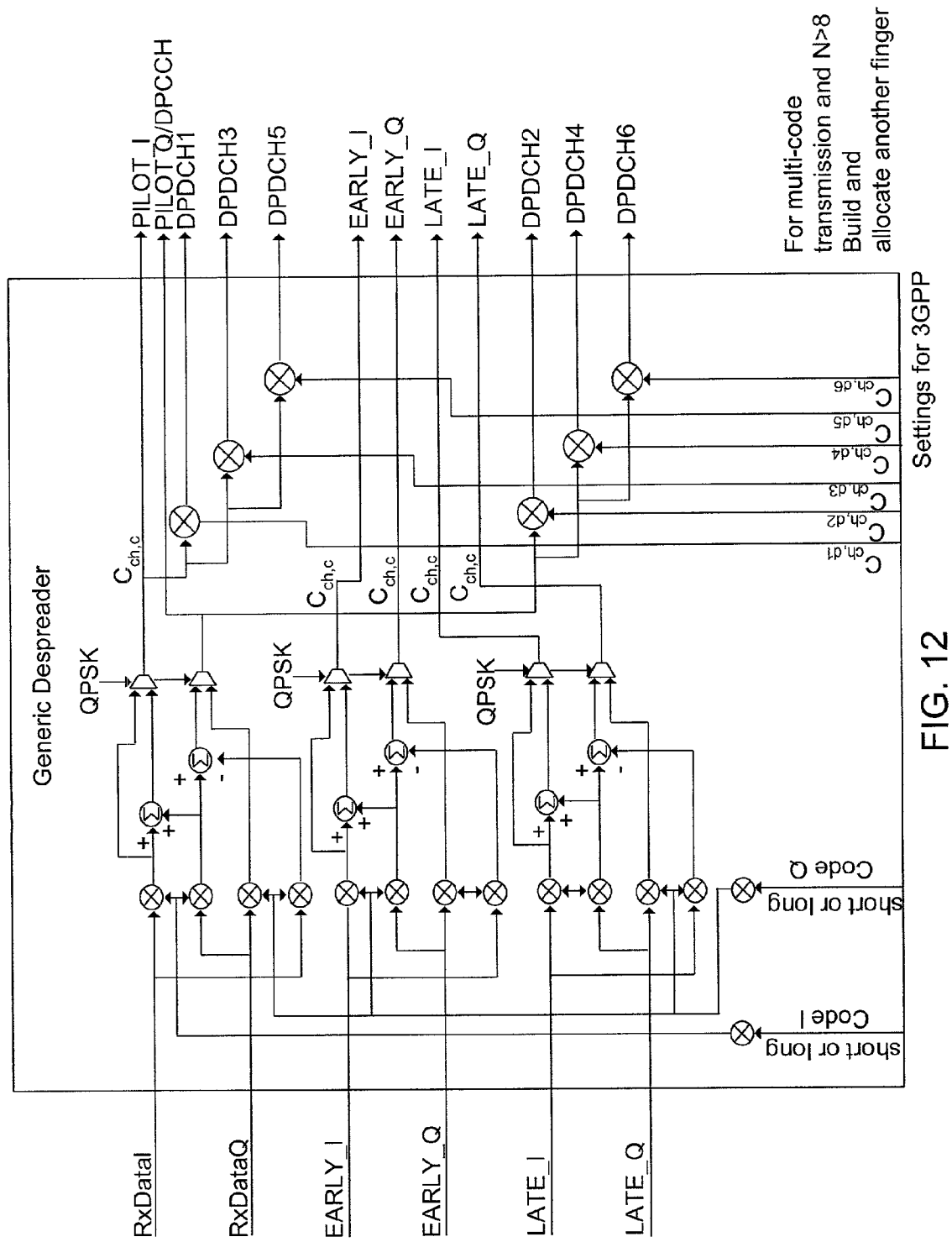
FIG. 12 illustrates an exemplary functional configuration of a chip-rate processing computation unit for the 3GPP standard in accordance with an embodiment of the invention.
Figure 13:
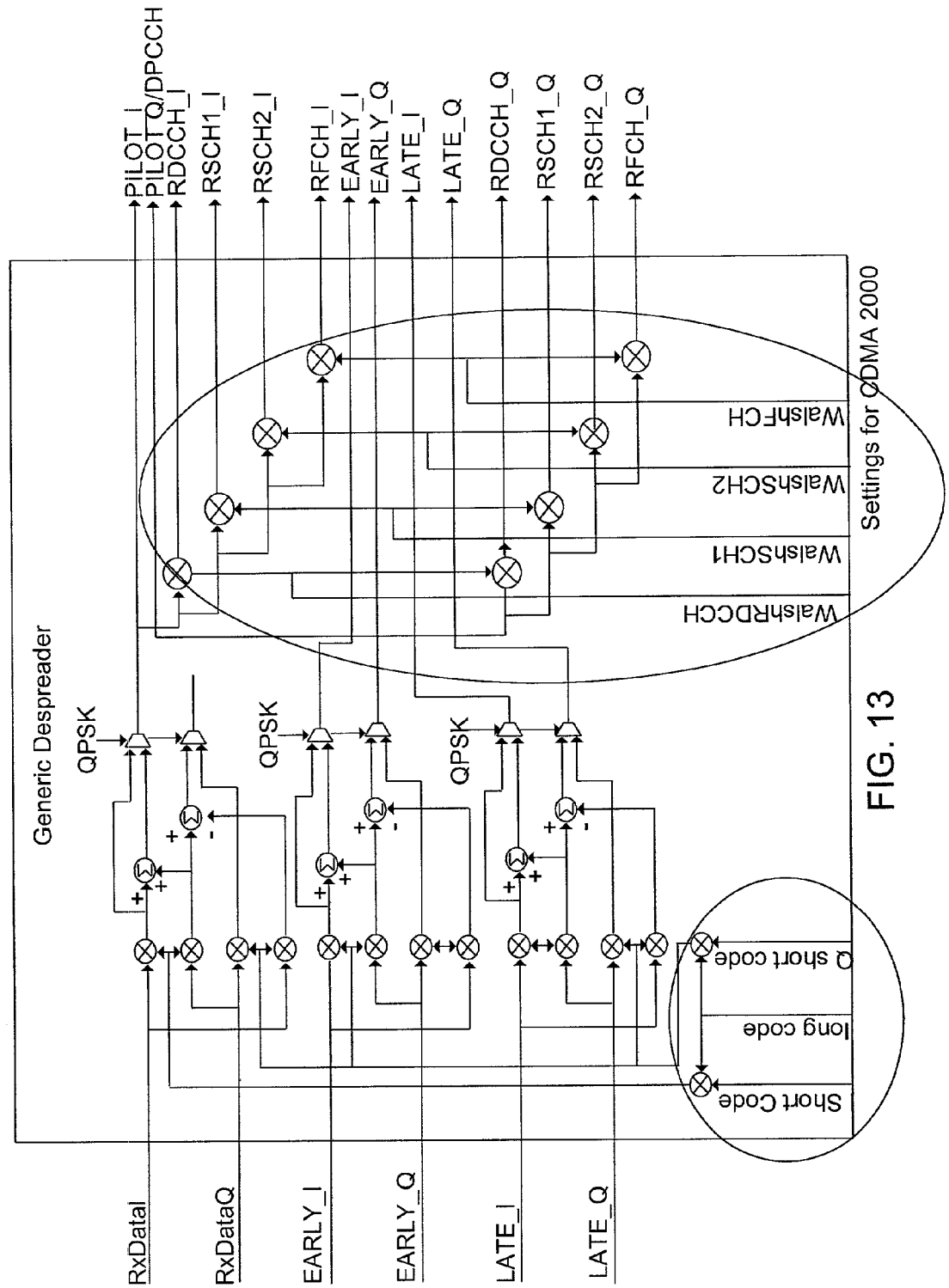
FIG. 13 illustrates an exemplary functional configuration of a chip-rate processing computation unit for the CDMA 2000 standard in accordance with an embodiment of the invention.
Figure 14:
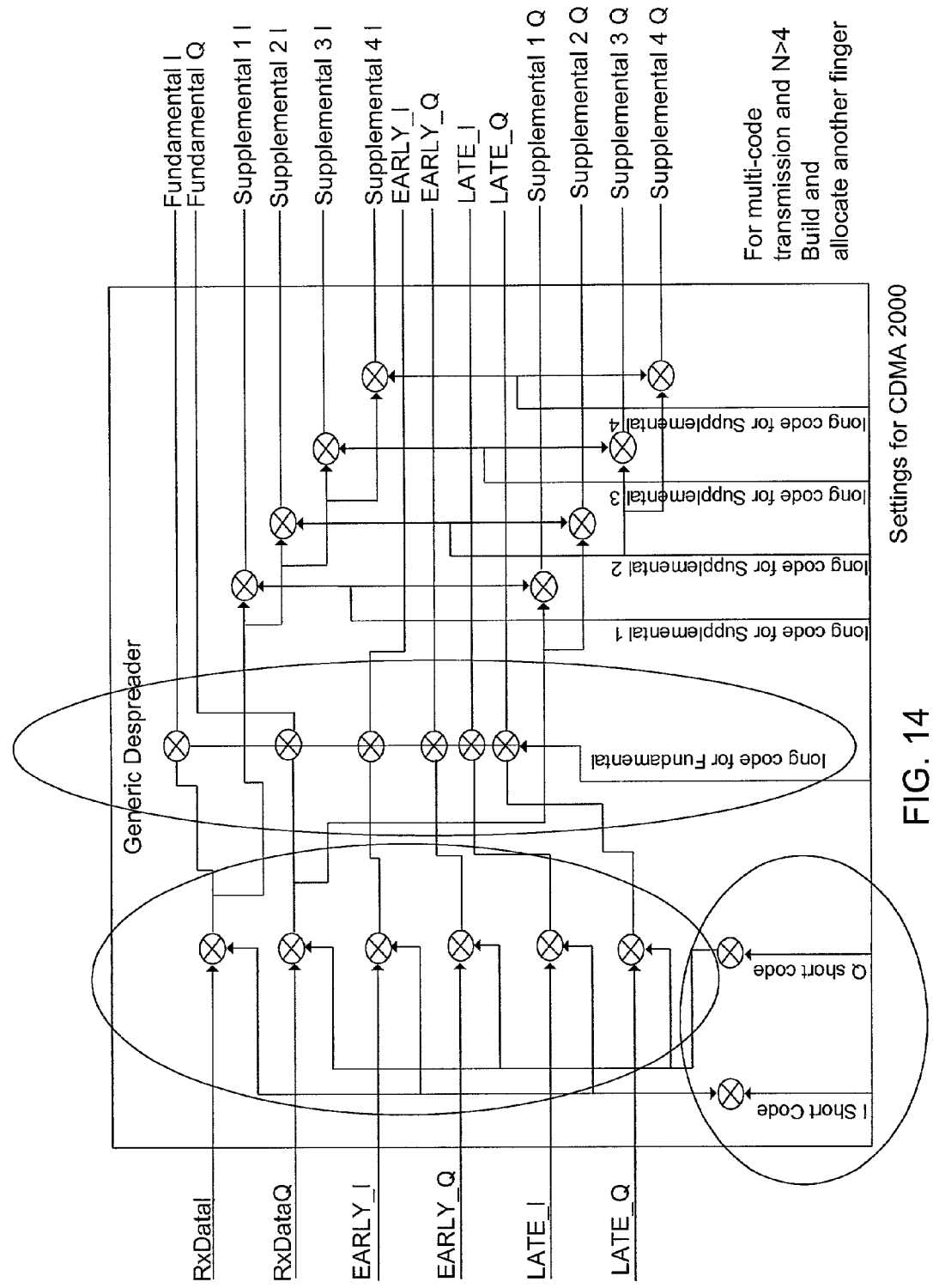
FIG. 14 illustrates an exemplary functional configuration of a chip-rate processing computation unit for the IS-95 standard in accordance with an embodiment of the invention.

Typically, in a CDMA base station transceiver system, at least one computation unit 36 should perform the function of chip-rate processing, including descrambling and dechannelization functions. The computation unit 36 utilized to perform such functions generally has a fixed hardware portion and a flexible hardware portion. The flexible hardware portion can be reconfigured to comply with different standards. FIGS. 12, 13, and 14 illustrate exemplary signal paths of chip-rate processing computation units 36 for three different standards. In FIG. 12, the signal path shown represents a computation unit 36 that is configured to perform descrambling and dechannelization under the 3GPP standard. In FIG. 13, the signal path shown represents a computation unit 36 that is configured to perform descrambling and dechannelization under the CDMA 2000 standard. In FIG. 14, the signal path shown represents a computation unit 36 that is configured to perform descrambling and dechannelization under the IS-95 standard. In both FIGS. 13 and 14, the circled portions have been reconfigured to comply with the respective standards. In an exemplary embodiment, the data sequencer 46 in the computation unit 36 controls the reconfiguration of the flexible portion of the computation unit.

Using the profiling steps described above, functions to be performed by a CDMA, TDMA or OFDM system can be categorized and a library of reconfigurable computation units 36 for each such multiple access system can be created. FIG. 15 illustrates an exemplary library of CDMA system computation units (kernels). Similarly, FIG. 16 illustrates an exemplary library of TDMA system computation units (kernels). The lists in FIG. 15 and FIG. 16 comprise exemplary computation unit types and are not exhaustive of all possible computation unit types.

Figure 17:
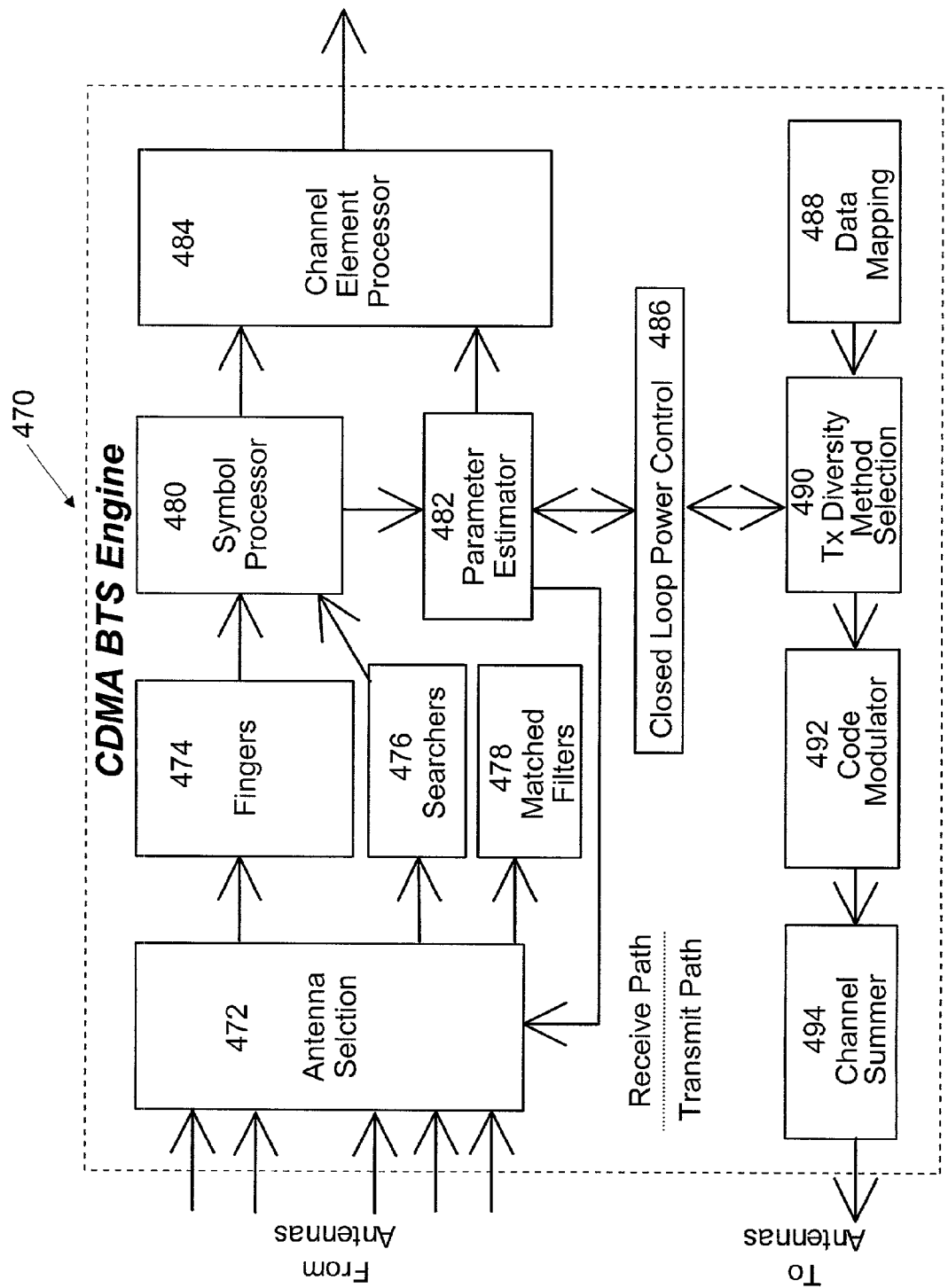
FIG. 17 illustrates a functional block diagram of an exemplary CDMA base-station engine architecture in accordance with an embodiment of the invention.

FIG. 17 illustrates an exemplary functional block diagram of a CDMA BTS engine 470 having multiple computation units performing various functions and an exemplary interconnection of the computation units as represented by arrows shown. The multiple computation units performs functions including antenna selection functions 472, finger functions 474, searcher functions 476, matched filter functions that perform preamble processing 478, symbol processor functions 480, parameter estimator functions 482, and channel element processor functions 484 in the receive path. Further, in the transmit path, the engine 470 includes data mapping functions 488, diversity method selection functions 490, code modulator functions 492, and channel summer functions 494. In addition, closed loop power control functions 486 are needed in both the receive path and the transmit path. In an exemplary embodiment, the stated functions of the CDMA BTS engine 470 are performed by processors 66, 72, and 74 (see FIG. 2). Allocation of these functions is determined according to the profiling method discussed above.

Figure 18:
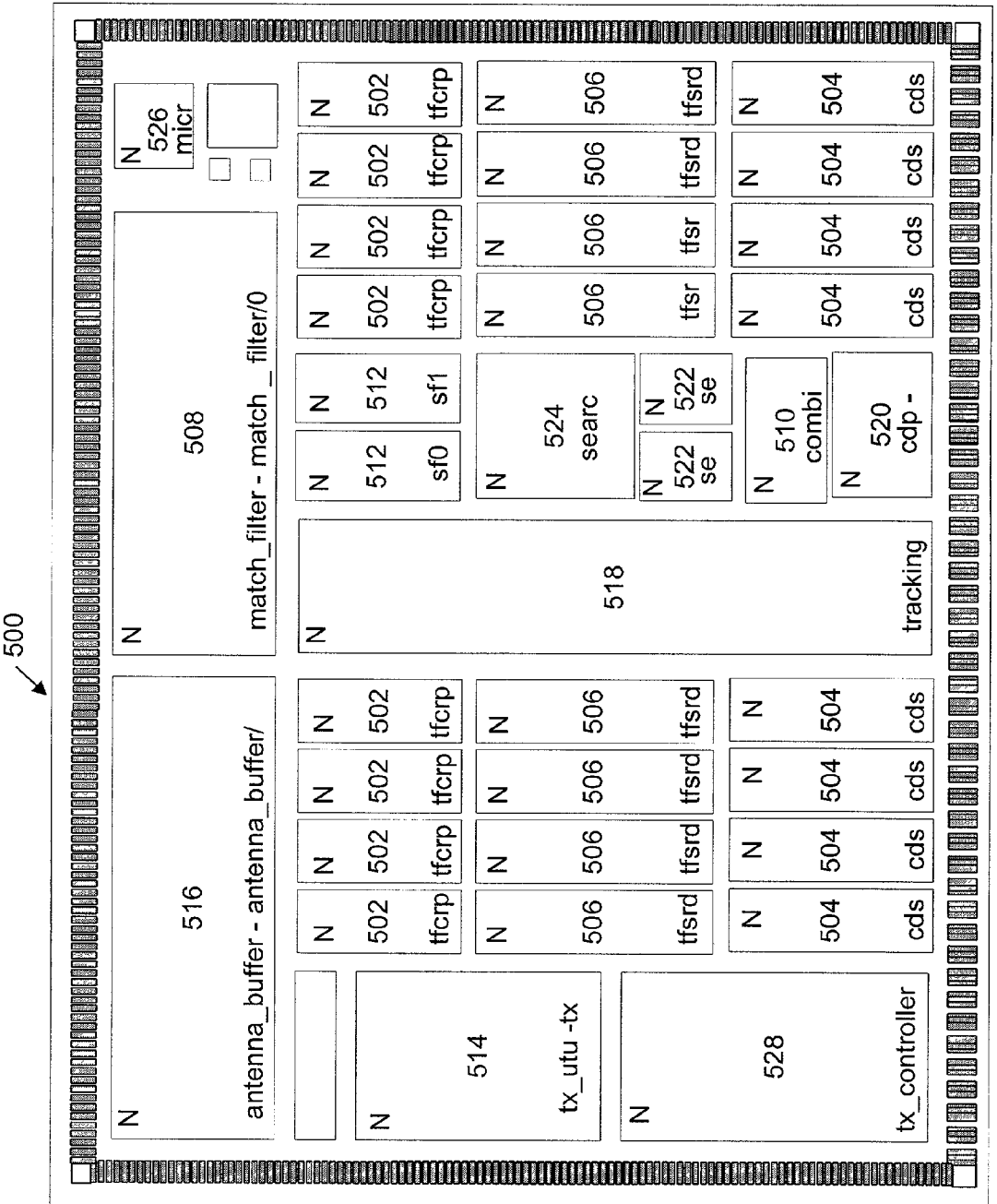
FIG. 18 illustrates an exemplary silicon layout of the CDMA base-station engine in accordance with an embodiment of the invention.

FIG. 18 illustrates an exemplary silicon layout 500 of the CDMA BTS engine 470, whereby one or more functions described above are implemented by one or more computation units. In FIG. 18, the floor plan 500 includes multiple finger computation units 502, multiple code generator computation units 504, multiple searcher computation units 506, a single preamble processor computation unit 508, multiple combiner computation units 510, multiple parameter estimator computation units 512, a single transmitter computation unit 514, an antenna buffer 516, a tracking scheduler 518, a combined data processor (cdp) 520, multiple search multi-selects 522, a search control 524, a microprocessor interface 526, and a transmitter controller 528.

In an exemplary embodiment, the finger computation units 502 despread and demodulate received signals, and provide symbols to the combiner computation unit 512. In an exemplary embodiment, each finger computation unit corresponds to a specific received multipath or echo for a specific user.

The code generator computation units 504 generate local replica of the scrambling and channelization codes. The output of the code generator computation units 504 is fed to the finger computation units 502, searcher computation units 506, and the preamble processor computation unit 508. In one embodiment, each finger computation unit 502, searcher computation unit 506, and the preamble processor computation unit 508 has its own corresponding code generator computation unit 504.

The searcher computation units 506 are hypothesis testing devices used to search for a new mobile that entered the antenna-sector of interest or search for a new multipath for an existing mobile.

The preamble processor computation unit 508 detects the presence of access bursts from new mobiles. An access burst is a random access attempt by a mobile.

The combiner computation units 510 ensure multipath and antenna diversity. The combiner computation units 510 take a set of finger computation units 502 corresponding to a single mobile and produce output statistics (e.g., sum, or weighted sum, etc.) that combines signals into one output.

The parameter estimator computation units 512 provide estimates for three types of random variables, namely, synchronization estimates (i.e., timing and frequency control estimates), channel estimates (i.e., amplitude, phase and delay estimates), and energy and interference estimates (i.e., signal interference ratio estimates).

The transmitter computation unit 514 generates downlink transmit signals of all common and dedicated control traffic channels.

The antenna buffer 516 performs antenna data decimation, antenna data buffering, and antenna source select functions.

The tracking scheduler 518 performs master timing control, uplink protocol timing updates, codes generation (except searcher), uplink context memory control and scheduling (except searcher), microprocessor interface 526 control, and time-slice pipeline control functions.

The combined data processor 520 performs combined-data scaling, receive-transmit data interface, and miscellaneous interfaces and functions.

The multiple search multi-selects 522 perform searcher symbol-rate processing and threshold and multi-dwell search algorithms.

The search control 524 performs searcher scheduling and context memory control, pipeline control, and microprocessor interface 526 control functions.

The microprocessor interface 526 provides general interface functions to a microprocessor. The transmitter controller 528 performs transmission control functions.

Advantageously, the architecture of the invention optimally combines fixed-function and reconfigurable logic resources. The system has reconfigurable control and data paths. The invention extends the performance efficiency of microprocessors and digital signal processors via the augmentation of data paths and control paths through a reconfigurable co-processing machine. The reconfigurability of the data path optimizes the performance of the data flow in the algorithms implemented on the processor.

The architecture efficiently redirects functions previously running on a fixed function data arithmetic logic unit to a more flexible heterogeneous reconfigurable multiprocessing unit. The invention does not depend upon the fine-grained reconfigurability of existing programmable logic devices, and hence solves an inherent problem to such devices, whereby the area and power of the chip are dominated by the routing resources. Furthermore, the invention does not substantially rely on instruction-set programmable processors. Instead, a quasi-fixed set of hardware computational resources that span the signal processing requirements of the standards, applications, and/or services of interest are configured together in a reprogrammable manner. This architecture can be applied to implement signal processing and/or control of processing applications.

In an exemplary embodiment, a base-station architecture may include only homogeneous computation units, where each homogeneous computation unit is identical in functionality, modes, and performance. In another exemplary embodiment, a base-station architecture may include heterogeneous computation units, where the computation units typically cover two or three different functions per channel.

For a given architecture, there are typically up to four modes of operation. These four modes of operation include, but are not limited to:

Mode 1: Initialization Mode:
  During the initialization mode, the general purpose microprocessor 74 initializes all memory locations, all state machines, and all configurations for each computation unit 36. Based on a predetermined initialization table, the general purpose microprocessor 74 also determines the dataflow or data routing destinations based on the incoming frame formats. A specific handshake protocol with each computation unit 36 determines the flow of data packets.

Mode 2: Data-Pump Mode:
  The data-pump mode is the steady-state operation mode of this system. In this mode, the software in the general purpose microprocessor 74 handles all data routing functionality. This data routing controls the pumping of data streams to the appropriate computation unit 36A–F for signal processing. Upon completion of the processing at computation units 36A–F, the data is either automatically routed to the next computation unit (if a predetermined sequence of operations is configured) or back to the I/O interface of the processor via interconnect mechanism 32.

Mode 3: Configure Request Handling Mode:
  The Configure Request Handling mode is used when there is a change in a cell's traffic profile. This type of change may occur because of a request from an existing user for a specific type of data service, or because a new user is roaming into a cell that already has a specific session underway that needs continued support. The request is passed on to the BTS 200 controller. Configuration information is then passed on to the BTS 200 controller, which instructs the general purpose microprocessor 74 in the channel pooling signal processor 76 to establish a new session. New sessions must be established without detrimentally affecting existing voice and data sessions already being supported by the channel pooling signal processor. The request appears in a random manner, and the general purpose microprocessor 74 must accommodate this traffic, typically within the maximum allowed setup time specified by the network designers.

Mode 4: Test Mode:
  The test mode is used to test all internal states of the channel pooling signal processor system, including the general purpose microprocessor 74, the interconnect mechanism 32, and computation units 36A–F.

Preferably, each of these modes of operation is set directly, via in-situ or over-the-network programming.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A signal processing apparatus, comprising:
   a channel pooling signal processor, including:
     a reconfigurable multiprocessor having a plurality of computation units and an interconnect mechanism, each computation unit having a data sequencer for controlling program execution, a configurable logic unit, and a dedicated memory;
     a test interface for testing the function of said plurality of computation units; and
     a general purpose microprocessor for managing data flow into and out of said channel pooling signal processor;
     wherein the interconnect mechanism connects said plurality of computation units, said test interface, and said general purpose microprocessor; and
   a digital signal processor connected to said channel pooling signal processor;
   wherein said channel pooling signal processor performs more computationally intensive signal processing operations and said digital signal processor performs less computationally intensive signal processing operations.

2. The signal processing apparatus of claim 1, further comprising:
   a second channel pooling signal processor for processing multiple data streams of voice and data information.

3. The signal processing apparatus of claim 1, wherein said plurality of computation units are heterogenous computation units.

4. The signal processing apparatus of claim 1, wherein said plurality of computation units are homogeneous computation units.

5. The signal processing apparatus of claim 1, wherein the computation units are flexibly configured and connected to perform any one of several different transceiver functions.

6. The signal processing apparatus of claim 1, wherein the computation units are configured to perform one or more of downconversion, dechannelization, demodulation, decoding, equalization, despreading, encoding, modulation, spreading, and diversity processing.

7. The signal processing apparatus of claim 1, wherein the computation units support time-division, code-division, and/or frequency division processing.

8. The signal processing apparatus of claim 1, wherein the test interface tests the computation units for functionality and reliability while maintaining status and operating modes of all channels that are not being tested in an unchanged state.

9. The signal processing apparatus of claim 1, wherein each of the computation units comprise a data sequencer that controls execution of a program defining operating instructions that run in the computation unit, a customized high-speed cache for storing data received from the data sequencer, a configurable arithmetic logic unit for performing mathematical operations on data received from the cache.

10. The signal processing apparatus of claim 1, wherein the computation units are configured to implement an architecture selected from the group consisting of reconfigurable logic with programmable function units, reconfigurable datapaths, reconfigurable arithmetic, and reconfigurable control.

11. A method for signal processing, comprising the steps of:
  processing high complexity algorithms in a channel pooling signal processor, said channel pooling signal processor including:
    a reconfigurable multiprocessor having a plurality of computation units and an interconnect mechanism, each computation unit having a data sequencer for controlling program execution, a configurable logic unit, and a dedicated memory;
    a test interface for testing the function of said plurality of computation units; and
    a general purpose microprocessor for managing data flow into and out of said channel pooling signal processor;
    wherein the interconnect mechanism connects said plurality of computation units, said test interface, and said general purpose microprocessor; and
  processing low complexity algorithms in a digital signal processor connected to said channel pooling signal processor.

12. The method of claim 11, further comprising the steps of:
  controlling program execution in a computation unit of said plurality of computation units;
  configuring a configurable logic unit in said computation unit in accordance with a standard; and
  storing program execution instructions in a dedicated memory in said computation unit.

13. The method of claim 11, further comprising the steps of:
  processing multiple data streams of voice and data information in a second channel pooling signal processor.

14. The method of claim 11, wherein the computation units are flexibly configured and connected to perform any one of several different transceiver functions.

15. The method of claim 11, wherein the computation units are configured to perform one or more of downconversion, dechannelization, demodulation, decoding, equalization, despreading, encoding, modulation, spreading, and diversity processing.

16. The method of claim 6, wherein the computation units support time-division, code-division, and/or frequency division processing.

17. The method of claim 11, wherein the test interface tests the computation units for functionality and reliability while maintaining status and operating modes of all channels that are not being tested in an unchanged state.

18. The method of claim 11, wherein each of the computation units comprise a data sequencer that controls execution of a program defining operating instructions that run in the computation unit, a customized high-speed cache for storing data received from the data sequencer, and a configurable arithmetic logic unit for performing mathematical operations on data received from the cache.

19. The method of claim 11, wherein the computation units are configured to implement an architecture selected from the group consisting of reconfigurable logic with programmable function units, reconfigurable datapaths, reconfigurable arithmetic, and reconfigurable control.

20. A base station transceiver comprising:
  an antenna for receiving communication signals; and
  a signal processing apparatus having:
    a channel pooling signal processor, including:
      a reconfigurable multiprocessor having a plurality of computation units and an interconnect mechanism, each computation unit having a data sequencer for controlling program execution, a configurable logic unit, and a dedicated memory;
      a test interface for testing the function of said plurality of computation units; and
      a general purpose microprocessor for managing data flow into and out of said channel pooling signal processor;
      wherein the interconnect mechanism connects said plurality of computation units, said test interface, and said general purpose microprocessor; and
    a digital signal processor connected to said channel pooling signal processor;
    wherein said channel pooling signal processor performs more computationally intensive signal processing operations and said digital signal processor performs less computationally intensive signal processing operations.

21. The base station transceiver of claim 20, wherein the computation units are flexibly configured and connected to perform any one of several different transceiver functions.

22. The base station transceiver of claim 20, wherein the computation units are configured to perform one or more of downconversion, dechannelization, demodulation, decoding, equalization, despreading, encoding, modulation, spreading, and diversity processing.

23. The base station transceiver of claim 20, wherein the computation units support time-division, code-division, and/or frequency division processing.

24. The base station transceiver of claim 20, wherein the test interface tests the computation units for functionality and reliability while maintaining status and operating modes of all channels that are not being tested in an unchanged state.

25. The base station transceiver of claim 20, wherein each of the computation units comprise a data sequencer that controls execution of a program defining operating instructions that run in the computation unit, a customized high-speed cache for storing data received from the data sequencer, and a configurable arithmetic logic unit for performing mathematical operations on data received from the cache.

26. The base station transceiver of claim 20, wherein the computation units are configured to implement an architecture selected from the group consisting of reconfigurable logic with programmable function units, reconfigurable datapaths, reconfigurable arithmetic, and reconfigurable control.

27. A method for processing communication signals, comprising the steps of:
receiving communication signals;
processing high complexity algorithms on the received communications signals in a channel pooling signal processor, said channel pooling signal processor including:
a reconfigurable multiprocessor having a plurality of computation units and an interconnect mechanism, each computation unit having a data sequencer for controlling program execution, a configurable logic unit, and a dedicated memory;
a test interface for testing the function of said plurality of computation units; and
a general purpose microprocessor for managing data flow into and out of said channel pooling signal processor;
wherein the interconnect mechanism connects said plurality of computation units, said test interface, and said general purpose microprocessor; and
processing low complexity algorithms in a digital signal processor connected to said channel pooling signal processor.

28. The method of claim 27, wherein the computation units are flexibly configured and connected to perform any one of several different functions of the base station transceiver.

29. The method of claim 27, wherein the computation units are configured to perform one or more of downconversion, dechannelization, demodulation, decoding, equalization, despreading, encoding, modulation, spreading, and diversity processing.

30. The method of claim 27, wherein the computation units support time-division, code-division, and/or frequency division processing.

31. The method of claim 27, wherein the test interface tests the computation units for functionality and reliability while maintaining status and operating modes of all channels not being tested in an unchanged state.

32. The method of claim 27, wherein each of the computation units comprise a data sequencer that controls execution of a program defining operating instructions that run in the computation unit, a customized high-speed cache for storing data received from the data sequencer, and a configurable arithmetic logic unit for performing mathematical operations on data received from the cache.

33. The method of claim 27, wherein the computation units are configured to implement an architecture selected from the group consisting of reconfigurable logic with programmable function units, reconfigurable datapaths, reconfigurable arithmetic, and reconfigurable control.

34. A signal processing apparatus, comprising:
a channel pooling signal processing means, including:
a reconfigurable multiprocessing means having a plurality of computing means and an interconnect means, each computing means unit having a data sequencing means for controlling program execution, a configurable logic means, and a dedicated memory;
a testing means for testing the function of said plurality of computing means; and
a general purpose microprocessing means for managing data flow into and out of said channel pooling signal processing means;
wherein the interconnect means connects said plurality of computing means, said testing means, and said general purpose microprocessing means; and
a digital signal processing means connected to said channel pooling signal processing means;
wherein said channel pooling signal processing means performs more computationally intensive signal processing operations and said digital signal processing means performs less computationally intensive signal processing operations.

35. A base station transceiver comprising:
an antenna means for receiving communication signals; and
a signal processing means having:
a channel pooling signal processing means, including:
a reconfigurable multiprocessing means having a plurality of computing means and an interconnect means, each computing means having a data sequencing means for controlling program execution, a configurable logic means, and a dedicated memory;
a testing means for testing the function of said plurality of computing means; and
a general purpose microprocessing means for managing data flow into and out of said channel pooling signal processing means;
wherein the interconnect means connects said plurality of computing means, said testing means, and said general purpose microprocessing means; and
a digital signal processing means connected to said channel pooling signal processing means;
wherein said channel pooling signal processing means performs more computationally intensive signal processing operations and said digital signal processing means performs less computationally intensive signal processing operations.

* * * * *

UNITED STATES PATENT AND TRADEMARK OFFICE
CERTIFICATE OF CORRECTION

PATENT NO. : 6,967,999 B2 Page 1 of 1
DATED : November 22, 2005
INVENTOR(S) : Ravi Subramanian et al.

It is certified that error appears in the above-identified patent and that said Letters Patent is hereby corrected as shown below:

Drawings,
Figure 17, Box 472, delete "selction" and insert -- selection --.

Column 14,
Line 4, delete "claim 6", and insert -- claim 11 --.

Signed and Sealed this

Fourteenth Day of March, 2006

JON W. DUDAS
*Director of the United States Patent and Trademark Office*